L. M. Reamy,
Seed Planter,
No. 62,886.
Patented Mar. 12, 1867.

Witnesses
H. G. Webber
Samuel Knight

Inventor
L. M. Reamy
By Knight Bro's
Attorneys

United States Patent Office.

LEONIDAS M. REAMY, OF KOKOMO, INDIANA.

Letters Patent No. 62,886, dated March 12, 1867.

---

IMPROVEMENT IN CORN PLANTERS.

---

*The Schedule referred to in these Letters Patent and making part of the same.*

---

TO WHOM IT MAY CONCERN:

Be it known that I, LEONIDAS M. REAMY, of Kokomo, Howard county, Indiana, have invented a new and useful Corn Planter; and I do hereby declare the following to be a full, clear, and exact description of the same, reference being had to the accompanying drawings, making part of this specification.

My invention relates to that class of devices for the mechanical planting of corn or other grain, by which the seed is evenly distributed in the earth and covered over, by one operation; and my invention consists in a device by which the seed is planted in the centre of a ridge formed by the machine throwing up earth from a furrow at each side; and, farther, in a device by which all stones, clods, and so forth, are rolled off said ridge, and the seed covered only with fine earth.

Figure 1:
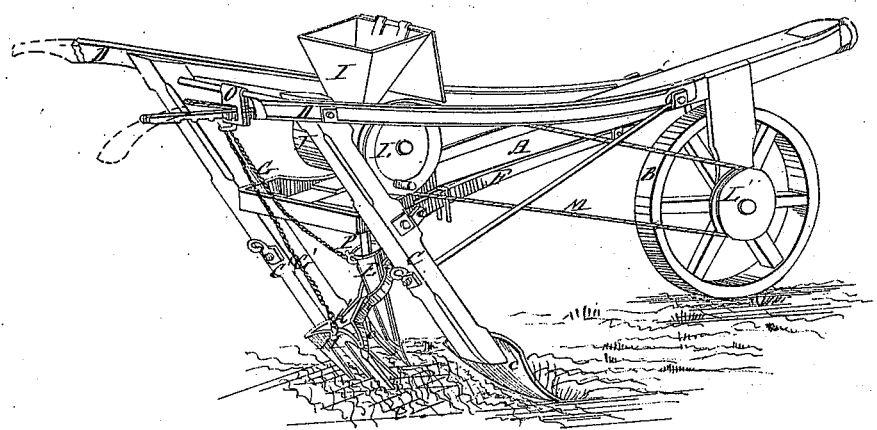
Figure 1 is a perspective view of a corn planter embodying my invention.
Figure 2:
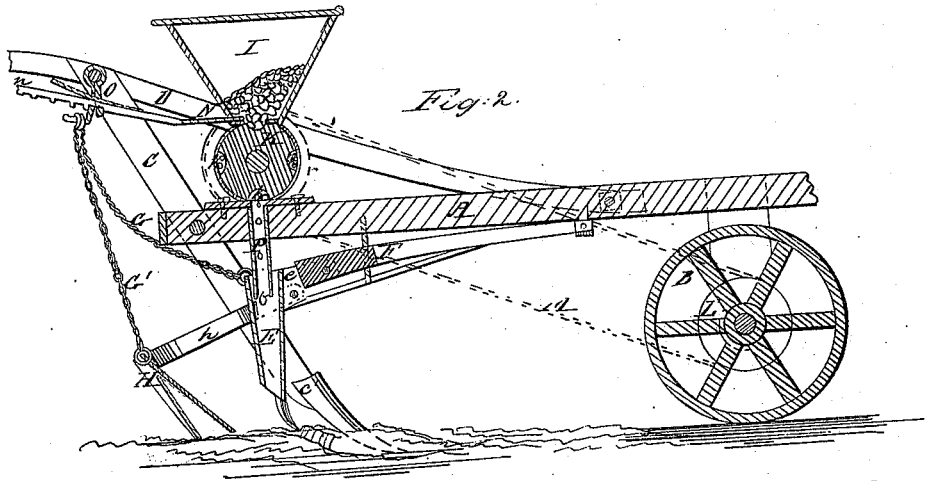
Figure 2 is a vertical longitudinal section of the same.

A is the main beam of the machine, supported at the forward end upon a wheel, B, and framed at the rear between two sheaths, C C', carrying at their lower ends plough-shares, c c', and connected at their upper ends with each other and the plough-handles D D' by a cross-bar. E is a customary hollow grain drill, pivoted by means of an arm, e, to a secondary bar, F, under the main beam A in such a manner that in its working position it stands nearly erect, a short distance in rear of the shares, its slope and distance from the ground being adjustable by means of the suspending chain G; or the drill may be turned into a horizontal position when not in use. H is a crescent-shaped rake, having a handle consisting of two arms, $h\ h'$, which are pivoted to the arm e of the drill, and have also a suspending chain, G. I is a funnel-shaped seed-box, supported on a cylindrical box, J, containing a drum, K, which has at one end a pulley, L, around which passes a belt, M, connecting it with a similar pulley, L', on the wheel B. A number of small cavities, $k\ k$, in the periphery of the drum K receive each the proper amount of seed to form a "hill" of corn. The aperture from the seed-box I to the drum K is closed by a sliding gate, N, the handle n of which, by means of notches and a spring, passing through a slot in an arm, O, upon the cross-bar connecting the sheaths C C' at the top, enables its adjustment to any desired position for regulating the opening of the aperture. From the lower side of the cylinder J issues a customary flexible tube, P, entering the top of the hollow drill E.

In the operation of the machine, the two shares C C', making a furrow at each side, throw the earth into a ridge between them, and the point of the drill following prepares the proper furrow for the seed on top of this ridge. The revolution of the wheel B, upon which the machine travels, by means of the pulleys L L', revolves the drum K, each cavity, k, in which receives in passing under the feed-gate N a few kernels of corn, which, after a half revolution, are dropped down the tube P through the drill to the earth. The crescent-shaped rake, coming after, draws the fine earth over the seed, while, in consequence of its shape, all stones, clods, and lumps of earth are rolled sideways into the furrows, keeping the top of the ridge composed entirely of fine, mellow earth. The action of the wheel B, in revolving the feed movement, insures the regularity of the intervals between the hills, and the quantity of seed deposited in each is regulated by means of the feed-gate.

I claim herein as new, and of my invention—

1. In the described combination, the two ridging shares c c', followed by the seed-dropping drill E, substantially as and for the purpose set forth.

2. A corn planter, consisting of two shares c c', making a central ridge on which to plant, combined with the drill E and crescent-shaped rake H, the whole arranged and operating substantially as set forth.

3. In this connection I claim the crescent-shaped grain coverer or rake H.

In testimony of which invention I hereunto set my hand.

LEONIDAS M. REAMY.

Witnesses:
GEO. H. KNIGHT,
JAMES H. LAYMAN.